Sept. 15, 1959     J. B. CODLIN     2,904,149
HYDRAULIC CLUTCH ACTUATOR UNIT
Filed March 15, 1954
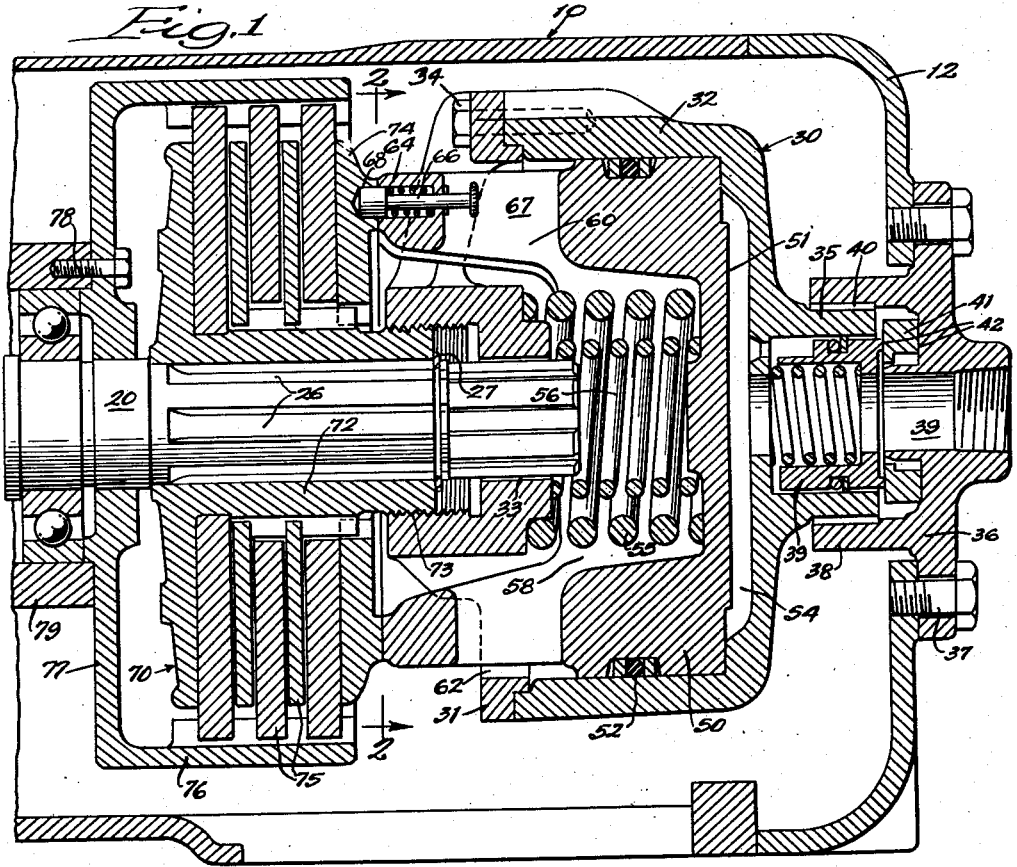
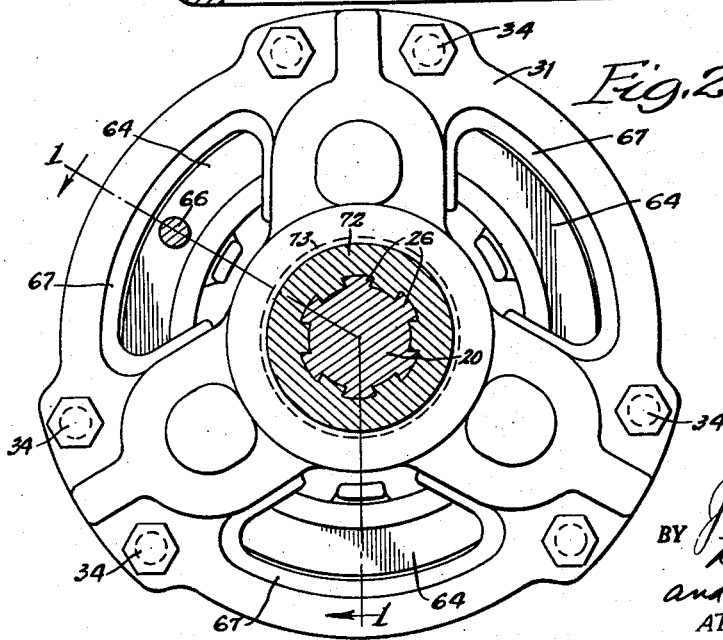

United States Patent Office 2,904,149
Patented Sept. 15, 1959

2,904,149

HYDRAULIC CLUTCH ACTUATOR UNIT

James B. Codlin, Deerfield, Ill., assignor, by mesne assignments, to Allis-Chalmers Manufacturing Company, West Allis, Wis., a corporation of Delaware Application March 15, 1954, Serial No. 416,107

1 Claim. (Cl. 192—85)

This invention relates generally to a hydraulic clutch, and more particularly to a hydraulic clutch actuator unit adapted to replace the actuator assemblies of fully mechanical clutch constructions.

In the construction of vehicles and power devices such as tractors and the like, the positioning of a clutch assembly adjacent the transmission and drive shaft necessitates the use of complicated mechanical linkages of extended length between a mechanical clutch control unit and the manual operator controls. Such controls must be conveniently positioned for use by an operator who is generally seated on the machine at a remote distance from the clutch.

Limitations are imposed upon the design of an efficient vehicle by this requirement for easily accessible controls for a mechanical clutch actuator which is ordinarily located on the machine in a relatively inaccessible position relative to the operator. The present invention contemplates overcoming such limitations by the use of a hydraulic clutch actuator. Hydraulic equipment permits the use of simple and flexible fluid lines which may be readily adapted to extend considerable distances along complex paths. Such hydraulic lines provide a simple and efficient means for replacing the complicated mechanical linkages between conventional mechanical clutch actuators and remote operator controls.

Tractors and similar power vehicles often employ a pair of clutch devices associated with the transmission for forward and reverse drive. The use of a hydraulic clutch actuator is of particular advantage in such constructions in replacing mechanical linkages, and is further desirable in permitting efficient balanced control of the respective clutches.

It is a primary object of the present invention to provide a hydraulic clutch actuator unit connected to a mechanical clutch and a transmission drive shaft.

It is a further object of the present invention to provide a hydraulic clutch actuator unit to replace the mechanical actuator and associated mechanical operator linkages of a mechanical clutch assembly.

With these and other objects in view, my invention consists in the construction, arrangement and combination of the various parts of my hydraulic clutch actuator unit whereby the objects contemplated are obtained as hereinafter more fully set forth, pointed out in my claim and illustrated in the accompanying drawing wherein:

Figure 1 is a side elevational view in cross section of a hydraulic clutch actuator unit constructed in accordance with the present invention.

Figure 2 is a vertical sectional view taken along the line 2—2 of Figure 1.

Referring to the drawing, I have shown a main housing, indicated generally at 10, holding the terminal end of a power shaft 20 which is adapted to be connected to a conventional drive transmission, not shown, for rotation therewith. The housing 10 is provided with a housing end cap 12 which forms an end closure for the housing.

A hydraulic cylinder assembly, indicated generally at 30, is freely received on the power shaft 20 at the terminal end thereof. The cylinder assembly 30 comprises an end portion 31 and a body portion 32. The end portion 31 is centrally apertured at 33 so as to clear a plurality of splines 26 formed on the power shaft 20. The cylinder body portion 32 is secured at its one end, by bolts 34, to the end portion 31 to form the cylinder assembly 30. The cylinder body 32 terminates at its other end in a longitudinally extending sleeve portion 35.

A cylinder end support plate 36 is suitably secured, as indicated at 37, to the housing end cap 12. The cylinder end support plate 36 is provided with a longitudinally extending portion 38 which projects inwardly within the housing end cap 12. The support plate 36 is provided with a hydraulic fluid inlet 39 which communicates with the interior of the hydraulic cylinder assembly 30. The longitudinally extending portions 35 and 38 of the cylinder body portion 32 and the cylinder end support plate 36, respectively, are positioned in telescoping relation one within the other. Bearings 40 are positioned between the elements 35 and 38 to facilitate their rotation. An annular ring member 41 provides suitable face seals 42 between the fixed support plate 36 and a spring-loaded bearing support means 39. In this manner, a fluid-tight rotating interconnection is provided by the portions 35 and 38.

The cylinder assembly 30 is supported at its one end by the power shaft 20, and is secured in a manner to be hereinafter described for direct rotation therewith. The assembly 30 is supported at its other end on plate 36 within the rotary bearing assembly which provides a sealed hydraulic fluid inlet therefor. The apertures formed in elements 12 and 36, to receive connecting means 37, are sufficiently oversized so as to permit slight relative lateral movement therebetween during assembly for suitable adjustment of the bearings 40.

A hydraulic piston 50 is positioned within the hydraulic cylinder assembly 30. The outer periphery of the piston 50 is in sliding engagement with the inner surface of the cylinder body portion 32.

Suitable bearings and seals, indicated generally at 52, provide fluid-tight sealing engagement between the sliding piston 50 and the cylinder body 32. A first chamber 54 is formed between the outer face or surface 51 of the piston 50 and the extended end portion 35 of the cylinder body 32. The chamber 54 is in closed fluid communication with the hydraulic fluid inlet 39. The admission of a control fluid through the inlet 39 will serve to produce a reaction force on the piston 50 tending to cause sliding movement thereof toward the left, as seen in Figure 1 of the drawing.

Loading springs 55 and 56 are positioned between the cylinder end portion 31 and the inner face of the slidable piston 50. The springs 55 and 56 are in compression and serve to bias the piston 50 toward the right, as seen in Figure 1, against the force of the hydraulic control fluid. The springs 55 and 56 are located within a second chamber 58 formed between the inner face of the piston 50 and the cylinder end portion 31.

The piston 50 is provided with a plurality of longitudinally extending projections 60. The cylinder end portion 31 of the cylinder 30 is provided with a plurality of apertures 62 through which the projections 60 extend to connect the piston to a clutch to be operated as described hereinafter and also to prevent rotation of the piston relative to the cylinder. The projections 60 are of a suitable length so as to extend through and outwardly beyond the cylinder end 31 when the piston 50 is in a position of furthest displacement toward the right, as seen in Figure 1. When the hydraulic fluid pressure applied through the first chamber 54 against the outer face 51 of the piston 50 provides a force which is less than that exerted by the compression loading springs 55 and 56, the piston 50 will be in the position shown in Figure 1. Under such conditions, the terminal end portions 64 of the projections 60 will project outwardly from the cylinder end 31, as illustrated in Figure 1.

The terminal end portion 64 of one of the projections 60 is provided with a manually retractable detent pin 66. The pin 66 is normally outwardly biased by suitable spring means, and is provided with handle means at its inner end for manual retraction. The one projection 60 is suitably apertured at 67 to provide access to the detent pin.

A disc pack type clutch, indicated generally at 70, is provided with an inner sleeve portion 72 which engages the plurality of longitudinal splines 26 to secure the clutch 70 to the power shaft 20. A retainer ring 27 serves to fix the sleeve 72 against sliding movement. The sleeve 72 and the cylinder end 31 are correspondingly screw-threaded at 73 for tight interconnection on the shaft 20. The clutch 70 is provided with a clutch pressure plate 74, and a clutch pack comprising a plurality of friction discs 75 alternately connected to the inner sleeve portion 72 and to an outer sleeve portion 76. The outer sleeve portion 76 provides a clutch connector plate 77. In this manner, the inner sleeve 72 constitutes a drive member which is mechanically interconnected by means of the friction discs 75 to the driven member 76, 77. The clutch connector plate 77 is joined, as at 78, to a sleeve 79 which is mounted for rotation about the power shaft 20 by means of a conventional bearing arrangement.

The detent pin 66 engages a recess 68 in the clutch pressure plate 74. In this manner, rotation of the cylinder 30 by the power shaft 20 effects rotation of the clutch pressure plate 74.

*Practical operation*

In the embodiment illustrated, the operation of the present device is best described by defining the power shaft 20 as being a driving member of a conventional transmission system, and the sleeve 79 as being the driven member of such a system. It is apparent, of course, that the functional relation between the shaft and the sleeve may be reversed, so that the sleeve 79 will represent the driving or input connection and the shaft 20 may represent the driven or output connection. Assuming all parts to be in a non-operating position of rest, as illustrated in Figure 1, the piston 50 within the hydraulic cylinder assembly 30 will be biased in its furthest position of sliding movement toward the right, so as to reduce the volume of chamber 54 to a minimum. Upon rotation of the shaft 20, the entire cylinder assembly 30 and the clutch pressure plate 74 will be rotated within the housing 10. The normal cooperative relation between the friction discs 75 of the clutch 70 is selected so as to permit free rotation therebetween. The rotation of the power shaft 20, the cylinder assembly 30, and the clutch pressure plate 74 will not, therefore, be communicated to the sleeve 79.

When it is desired to interconnect the driving and driven elements of the power transmission, hydraulic fluid is introduced by suitable means, not shown, at the inlet 39 into the chamber 54 within the rotating hydraulic cylinder assembly 30. When the static pressure within the chamber 54 has reached a suitable level so as to overcome the biasing force of the springs 55 and 56, the piston 50 will tend to be slidably moved toward the left within the cylinder 30. This tendency of the piston 50 to slide will result in a force which will be transmitted by the projections 60 directly to the clutch pressure plate 74. This hydraulic force will, therefore, effect a compression of the friction discs 75 of the clutch disc pack. The inner sleeve 72, which is directly rotated by the drive shaft 20, and which constitutes a driving element, will then be interconnected by means of the clutch disc pack to the outer sleeve 76, clutch connector plate 77, and the shaft sleeve, or driven element, 79.

Upon release of hydraulic fluid from the chamber 54 outwardly from the fluid inlet 39, the decreased static pressure therein will permit a return of the piston 50 within the cylinder 30 to its original position of furthest movement toward the right in response to the biasing force of the loading springs 55 and 56.

It will be apparent that I have provided an efficient and compact hydraulic clutch actuator unit which permits quick and accurate interconnection of a transmission drive element to a driven element. My hydraulic actuator unit is of compact size and form and is adapted to wholly replace the mechanical clutch actuator within the main housing of conventional constructions without necessitating redesign or expensive modification of existing structures.

Changes may be made in the construction and arrangement of the parts of my hydraulic clutch actuator unit without departing from the real purpose and scope of my invention, and it is my intention to cover by my claim any modified forms of structure or use of mechanical improvements which may be reasonably included within the scope.

I claim as my invention:

In the combination including a driving element, a driven element, and clutch means operative when actuated to interconnect said driving and driven elements, a hydraulic clutch actuator comprising a hydraulic cylinder, a piston within said cylinder in sliding fluid-tight engagement therewith, said piston dividing said cylinder into a first and second chamber, said cylinder being screw-threadedly secured at its one end to one of said driving and driven elements, support means cooperating with the other end of said cylinder and providing bearings upon which said cylinder is freely rotatable, sealing means forming a fluid-tight joint between said cylinder and said support means, said support means having a hydraulic fluid inlet communicating with said first chamber of said cylinder, a plurality of projections extending longitudinally outwardly from said piston through said second chamber, resilient means within said second chamber normally biasing said piston toward the fluid inlet end of said cylinder, said projections at all times extending outwardly from said piston through said second chamber, parts carried by the cylinder and engageable with the projections to prevent relative rotation between the cylinder and piston, and one of said projections having releasable spring-biased detent means serving to interconnect said one projection and an actuating element of said clutch, hydraulic fluid pressure within said first chamber being operative to exert a force against said piston tending to move it away from said fluid inlet, whereby when said pressure is greater in magnitude than the biasing force exerted by said resilient means, said projections are operative to transmit an actuating force to said clutch for connecting said driving and driven elements.

References Cited in the file of this patent

UNITED STATES PATENTS

| 1,879,633 | Olsen | Sept. 27, 1932 |
| 1,971,380 | Pearmain | Aug. 28, 1934 |
| 2,018,014 | Fahrney | Oct. 22, 1935 |
| 2,089,733 | Criley | Aug. 10, 1937 |
| 2,143,861 | Clouse | Jan. 17, 1939 |
| 2,393,835 | Stevenson | Jan. 29, 1946 |
| 2,403,579 | Carpenter | July 9, 1946 |
| 2,528,314 | Langdon | Oct. 31, 1950 |
| 2,583,556 | Fleischel | Jan. 29, 1952 |
| 2,614,396 | Ratermann | Oct. 21, 1952 |
| 2,639,795 | Munschauer | May 26, 1953 |

FOREIGN PATENTS

| 898,174 | France | Apr. 12, 1945 |
| 259,546 | Switzerland | June 16, 1949 |
| 696,785 | Great Britain | Sept. 9, 1953 |